(12) United States Patent
Frank

(10) Patent No.: US 10,888,106 B2
(45) Date of Patent: Jan. 12, 2021

(54) STAMPING AND EMBOSSING SYSTEM FOR EDIBLE ITEMS

(71) Applicant: Aimee Nicole Frank, Los Angeles, CA (US)

(72) Inventor: Aimee Nicole Frank, Los Angeles, CA (US)

(*) Notice: Subject to any disclaimer, the term of this patent is extended or adjusted under 35 U.S.C. 154(b) by 123 days.

(21) Appl. No.: 15/927,473

(22) Filed: Mar. 21, 2018

(65) Prior Publication Data

US 2018/0271137 A1 Sep. 27, 2018

Related U.S. Application Data

(60) Provisional application No. 62/474,830, filed on Mar. 22, 2017.

(51) Int. Cl.
*A21C 15/00* (2006.01)
*A23P 20/15* (2016.01)
*A47J 9/00* (2006.01)
*A21C 11/02* (2006.01)
*A21C 11/08* (2006.01)

(52) U.S. Cl.
CPC ............ *A23P 20/15* (2016.08); *A21C 15/002* (2013.01); *A47J 9/007* (2013.01); *A21C 11/02* (2013.01); *A21C 11/08* (2013.01)

(58) Field of Classification Search
CPC ....... A21C 15/002; A21C 11/02; A21C 11/08; A47J 9/007; A23P 20/15
See application file for complete search history.

(56) References Cited

U.S. PATENT DOCUMENTS

| | | | | |
|---|---|---|---|---|
| 1,926,548 | A * | 9/1933 | Mears | A21C 9/068 |
| | | | | 426/556 |
| 2,312,511 | A * | 3/1943 | Weinberg | A47J 9/00 |
| | | | | 425/304 |
| 3,446,143 | A | 5/1969 | Williamson | |
| 4,384,838 | A * | 5/1983 | Laughlin | A21C 11/106 |
| | | | | 249/102 |
| 5,642,659 | A * | 7/1997 | Sesona | A47J 37/0611 |
| | | | | 99/376 |
| 6,990,892 | B2 | 1/2006 | Errera | |
| 7,331,776 | B2 | 2/2008 | Errera | |
| 9,044,026 | B2 * | 6/2015 | Bakhoum | A21C 11/12 |
| 9,220,280 | B2 * | 12/2015 | Lion | A21C 11/04 |
| 2004/0040443 | A1 * | 3/2004 | Errera | A21C 11/02 |
| | | | | 99/388 |
| 2004/0040446 | A1 * | 3/2004 | Errera | A21C 11/02 |
| | | | | 99/388 |
| 2005/0150394 | A1 * | 7/2005 | Errera | A21C 11/02 |
| | | | | 99/388 |
| 2006/0225579 | A1 * | 10/2006 | Errera | A21C 11/02 |
| | | | | 99/388 |

(Continued)

*Primary Examiner* — Seyed Masoud Malekzadeh
(74) *Attorney, Agent, or Firm* — Seed Intellectual Property Law Group LLP

(57) ABSTRACT

A stamp system includes a top portion and a bottom portion, each shaped to resemble a slice of bread. The top portion has a lower surface that forms a pattern to be stamped into an edible item. The bottom portion has an upper surface that is configured with a tray that is shaped to carry an edible ink. The stamp system is used to stamp both a physical impression and a pattern in edible ink onto an edible item, such as a sandwich made of sliced bread.

14 Claims, 4 Drawing Sheets

(56) References Cited

U.S. PATENT DOCUMENTS

| | | | |
|---|---|---|---|
| 2007/0092614 A1* | 4/2007 | Waldock | C09D 11/30 |
| | | | 426/383 |
| 2008/0241326 A1* | 10/2008 | Ekberg | A21C 9/068 |
| | | | 426/512 |
| 2010/0068321 A1* | 3/2010 | Errera | A21C 11/02 |
| | | | 425/96 |
| 2012/0141636 A1 | 6/2012 | Ackley, Jr. et al. | |
| 2014/0234500 A1* | 8/2014 | Mitchell | H04N 1/00188 |
| | | | 426/302 |

* cited by examiner

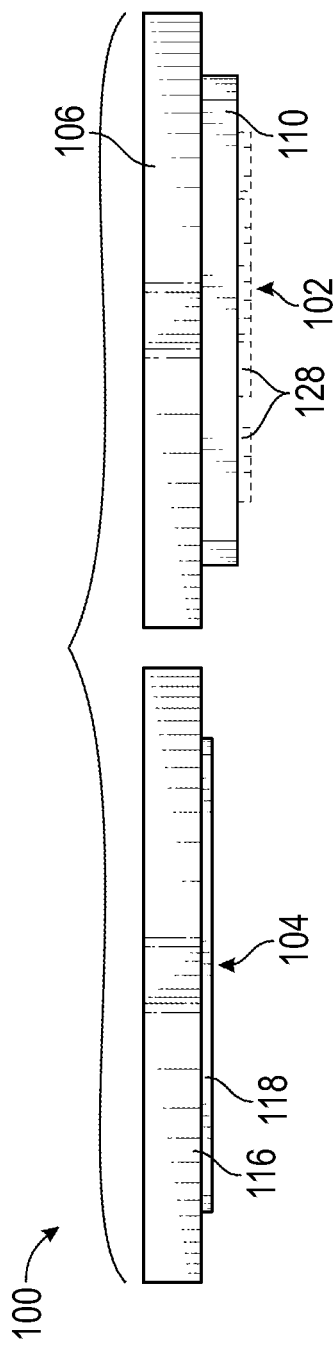
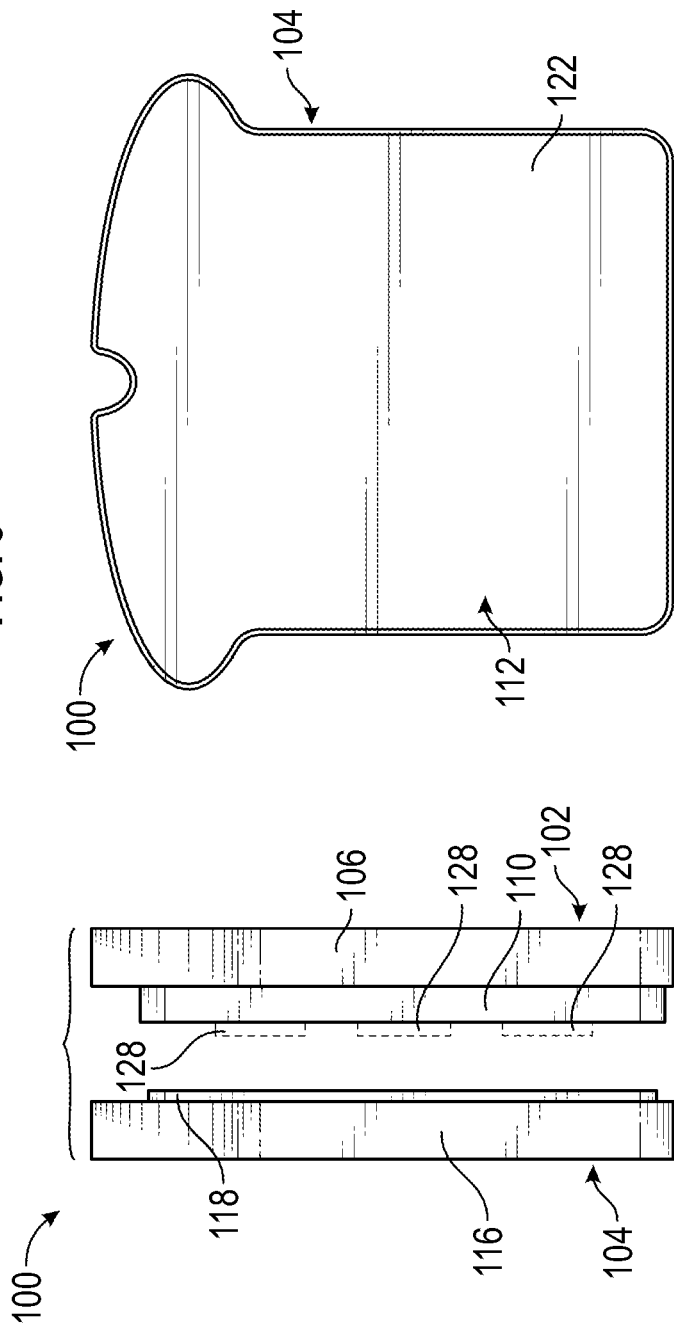

STAMPING AND EMBOSSING SYSTEM FOR EDIBLE ITEMS

CROSS-REFERENCE TO RELATED APPLICATIONS

The present application claims the benefit under 35 U.S.C. § 119(e) of U.S. Provisional Patent Application No. 62/474,830, filed Mar. 22, 2017, which is incorporated by reference in its entirety.

COPYRIGHT NOTICE

A portion of the disclosure of this patent document contains material that is subject to copyright protection. The copyright owner has no objection to the facsimile reproduction by any one of the patent document or the patent disclosure, as it appears in the Patent and Trademark Office patent files or records, but otherwise reserves all copyright rights whatsoever.

BACKGROUND

Technical Field

The present disclosure is related generally to stamp systems, and more particularly to stamp systems designed for stamping edible items.

Description of the Related Art

Stamps are commercially available in a wide variety of configurations. Some stamps may be used to apply ink to a surface in a desired pattern, while other stamps may be used to deform a surface to create a desired physical shape in the surface.

In the past, manufacturers have developed overly complex stamping systems with hinges and springs. However, these types of movable parts unfortunately may become clogged or otherwise gummed up with food particulates of an edible item when the stamping system is used on a food product.

While such overly complex stamping systems may have achieved some limited amount of success, there remains a need for a more succinct stamping systems without hinges and springs that may be used for stamping and embossing edible items.

BRIEF SUMMARY

A method of stamping an edible item using a stamp system having a top portion and a bottom portion may be summarized as including: selecting a stamp insert having a stamp design from a plurality of stamp inserts; temporarily fastening the selected stamp insert to a lower surface of the top portion of the stamp system; positioning an edible ink in a tray formed in an upper surface of the bottom portion of the stamp system; engaging the lower surface of the top portion with the upper surface of the bottom portion so the selected stamp insert is pushed into and retains some of the edible ink; impressing the selected stamp insert into a surface of the edible item and creating an embossed pattern matching the stamp design in the surface of the edible item; and removing the selected stamp insert from the surface of the edible item, leaving at least a portion of the edible ink in an ink pattern matching the stamp design in the embossed pattern.

The edible ink may be a first edible ink of a first color and the method may further include: selecting a second stamp insert having a second stamp design from the plurality of stamp inserts; temporarily fastening the second stamp insert to the lower surface of the top portion of the stamp system; positioning a second edible ink of a second color different from the first color in the tray; engaging the lower surface of the top portion with the upper surface of the bottom portion so the second stamp insert is pushed into and retains some of the second edible ink; impressing the second stamp insert into the surface of the edible item and creating a second embossed pattern matching the second stamp design in the surface of the edible item; and removing the second stamp insert from the surface of the edible item, leaving at least a portion of the second edible ink in a second ink pattern matching the second stamp design in the second embossed pattern. Positioning the edible ink in the tray may include positioning the edible ink within a bottom ridge of the bottom portion of the stamp system. Positioning the edible ink in the tray may include positioning an edible ink pad within the bottom ridge of the bottom portion of the stamp system. The edible item may be a slice of bread, tortillas, pancakes, or the like.

A stamping system for stamping an edible item may be summarized as including: a top portion including a main body having an upper surface, a lower surface, and a top ridge coupled to and extending perpendicularly downward from the lower surface of the main body of the top portion, the top ridge circumscribing the top portion near an outer periphery of the top portion; a plurality of interchangeable removable inserts, each of the removable inserts including a respective raised design that includes letters, symbols, or combinations thereof, wherein the plurality of interchangeable removable inserts are attachable and removable from the lower surface of the main body of the top portion; a bottom portion including a main body having an upper surface, a lower surface, and a bottom ridge coupled to and extending perpendicularly upward from the upper surface of the main body of the bottom portion, the bottom ridge circumscribing the bottom portion near an outer periphery of the bottom portion, and an ink pad positioned within the circumscribing bottom ridge of the bottom portion, the ink pad configured to receive ink that is transferable to the plurality of interchangeable removable inserts when the top portion of the stamping system is placed onto the bottom portion of the stamping system; wherein the plurality of interchangeable inserts are configurable to stamp the ink pad positioned within the circumscribing bottom ridge of the bottom portion, and then stamp a surface of an edible item.

An inner surface of the top ridge of the top portion may engage with an outer surface of the bottom ridge of the bottom portion when the top portion of the stamping system is placed onto the bottom portion of the stamping system. The circumscribing bottom ridge of the bottom portion may have a circular shape and the circumscribing top ridge of the top portion may have a corresponding circular shape. The circumscribing bottom ridge of the bottom portion may have a shape that is generally rectangular with curved corners and the circumscribing top ridge of the top portion may have a corresponding shape that is generally rectangular with curved corners. One of the removable inserts may be removably coupled to the lower surface of the main body of the top portion. The one of the removable inserts may be removably coupled to the lower surface of the main body of the top portion by a mechanical fastener. The one of the removable inserts may be removably coupled to the lower surface of the main body of the top portion by an adhesive. The stamping system may further include: a second bottom ridge coupled to and extending perpendicularly upward from the upper surface of the main body of the bottom portion outside of the bottom ridge of the main body of the bottom portion. The stamping system may include no springs.

A stamping system for stamping an edible item may be summarized as including: a top portion including a main body having an upper surface, a lower surface, and a top ridge coupled to and extending perpendicularly downward from the lower surface of the main body of the top portion, the top ridge circumscribing the top portion near an outer periphery of the top portion; a plurality of interchangeable removable inserts, each of the removable inserts including a respective raised design that includes letters, symbols, or combinations thereof, wherein the plurality of interchangeable removable inserts are attachable and removable from the lower surface of the main body of the top portion; a bottom portion including a main body having an upper surface, a lower surface, and an inner bottom ridge coupled to and extending perpendicularly upward from the upper surface of the main body of the bottom portion, the inner bottom ridge circumscribing the bottom portion near an outer periphery of the bottom portion, the bottom portion further including an outer bottom ridge coupled to and extending perpendicularly upward from the upper surface of the main body of the bottom portion outside of the inner bottom ridge of the main body of the bottom portion, the outer bottom ridge circumscribing the bottom portion at the outer periphery of the bottom portion, and an ink pad positioned within the circumscribing bottom ridge of the bottom portion, the ink pad configured to receive ink that is transferable to the plurality of interchangeable removable inserts when the top portion of the stamping system is placed onto the bottom portion of the stamping system; wherein the plurality of interchangeable inserts are configurable to stamp the ink pad positioned within the circumscribing bottom ridge of the bottom portion, and then stamp a surface of an edible item; wherein the top ridge of the top portion is configured to be seated within a gap between the inner bottom ridge and the outer bottom ridge of the bottom portion, wherein the stamping system includes no springs.

The inner bottom ridge of the bottom portion may include a first section, a second section, a third section, and a fourth section, wherein the first section is parallel to the third section, and wherein the second section is parallel to the fourth section. The top ridge of the top portion may include a first section, a second section, a third section, and a fourth section, wherein the first section is parallel to the third section, and wherein the second section is parallel to the fourth section. The first section and the third section of the inner bottom ridge of the bottom portion may be parallel to the first section and the third section of the top ridge of the top portion, and wherein the second section and the fourth section of the inner bottom ridge of the bottom portion may be parallel to the second section and the fourth section of the top ridge of the top portion. A gap between the inner bottom ridge and the outer bottom ridge of the bottom portion may correspond to a thickness of the top ridge of the top portion. The top ridge of the top portion may be configured to be seated snugly within the gap between the inner bottom ridge and the outer bottom ridge of the bottom portion.

These features along with other technological improvements, which will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

FIG. 5 is a rear view of the stamp system of FIG. 1 in an open configuration with the top portion of the stamp system positioned adjacent to the bottom portion of the stamp system.

FIG. 6 is a left-side view of the stamp system of FIG. 1 with the top portion of the stamp system separated from the bottom portion of the stamp system, which is a mirror image of a right-side view thereof.

FIG. 7 is a bottom view of the stamp system of FIG. 1 in a closed configuration, which is the same as the top view of FIG. 3.

DETAILED DESCRIPTION

In the description below, for purposes of explanation only, specific nomenclature is set forth to provide a thorough understanding of the present system and method. However, it will be apparent to one skilled in the art that these specific details are not required to practice the teachings of the present system and method.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples. Additionally, the headings and Abstract provided herein are for convenience only and do not limit the scope or meaning of the embodiments.

Figure 1:
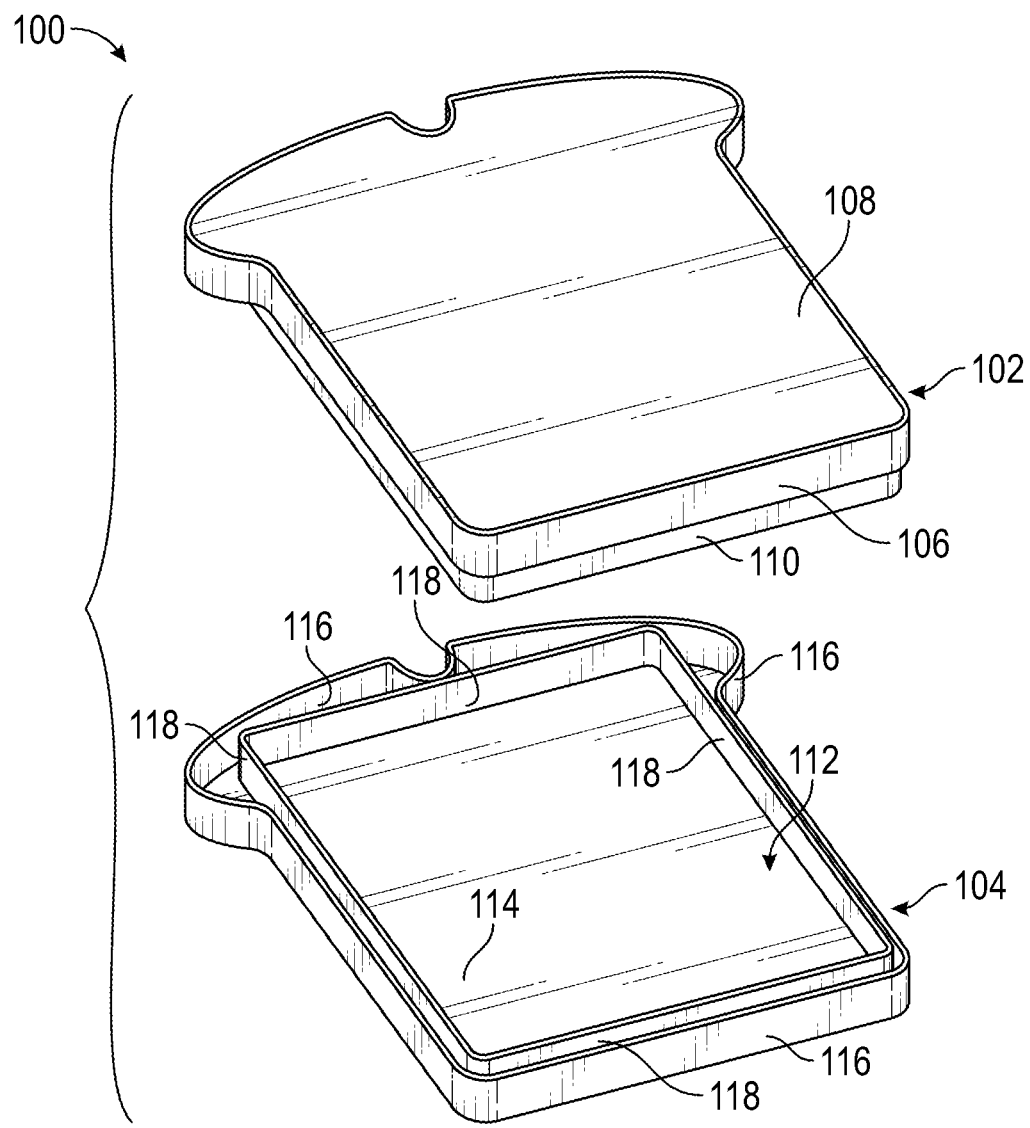
FIG. 1 illustrates a perspective view of a stamp system with a top portion of the stamp system separated from a bottom portion of the stamp system.

FIG. 1 illustrates a perspective view of a stamp system 100 that includes distinct and separable top and bottom portions 102 and 104. The top and bottom portions 102 and 104 are each generally sized and shaped like a slice of bread, and have various features and dimensions, selected for purposes of ornamentality, that are unrelated to the utilitarian features described herein. In other embodiments, the top and bottom portions 102 and 104 may have any other suitable shapes, dimensions, or ornamental features. Specifically, the top portion 102 has an upper surface 108 that has the appearance of a slice of bread and a lower surface 120 that includes a stamp mounting plate. The stamp mounting plate on the lower surface 120 of the top portion 102 may carry lettering or other designs to be impressed upon a piece of edible material (e.g., a sandwich). Correspondingly, the bottom portion 104 of the stamp system 100 has an upper surface 114 that is configured to include a tray for containing edible ink (or an edible ink pad). The ink tray contains edible ink that is picked up by the lettering or other designs carried by the stamp mounting plate on the lower surface 120 of the top portion 102.

Specifically, the top portion 102 of the stamp system 100 includes a main body 106 having a generally planar upper surface 108, a generally planar lower surface 120 (see FIG. 2), and a ridge 110 that is coupled to the lower surface 120 and extends perpendicularly downward from the main body 106 and its lower surface 120. As illustrated in FIG. 1, the main body 106 of the top portion 102 defines the outer periphery and the overall shape of the top portion 102.

The bottom portion 104 of the stamp system 100 includes a main body 112 having a generally planar upper surface 114 and a generally planar lower surface 122 (see FIG. 7). The bottom portion 104 also includes an outer ridge 116 that is coupled to the upper surface 114 and extends perpendicularly upward from the main body 112 and its upper surface 114. As illustrated in FIG. 1, the outer ridge 116 of the bottom portion 104 defines the outer periphery and the overall shape of the bottom portion 104, which are the same as the outer periphery and the overall shape of the top portion 102. The bottom portion 104 also includes an inner ridge 118 that is coupled to the upper surface 114 and extends perpendicularly upward from the main body 112 and its upper surface 114. As illustrated in FIG. 1, the inner ridge 118 of the bottom portion 104 has a generally rectangular shape with curved corners which, in some implementations, may be a generally square shape with curved corners. In other implementations, the generally rectangular shape of the inner ridge 118 may be modified to be more rectangular (or other shaped) in order to more specifically match other types of edible food (e.g., a generally circular shaped inner ridge 118 for pancakes).

As illustrated in FIG. 1, the inner ridge 118 of the bottom portion 104 of the stamp system 100 is positioned inside of the outer ridge 116 of the bottom portion 104 of the stamp system 100. In one embodiment, the inner ridge 118 has three of four edges that are parallel to three respective edges of the outer ridge 116, and that are spaced apart from the three respective edges of the outer ridge 116 by a gap having a constant width. The constant width of the gap between the three edges of the inner ridge 118 and the three respective edges of the outer ridge 116 corresponds to a width or a thickness of the ridge 110 of the top portion 102 of the stamp system 100. Specifically, the outer ridge 116 of the bottom portion 104 of the stamp system 100 and the inner ridge 118 of the bottom portion 104 of the stamp system 100 are shaped and spaced to receive the ridge 110 of the top portion 102 of the stamp system 100.

Figure 2:
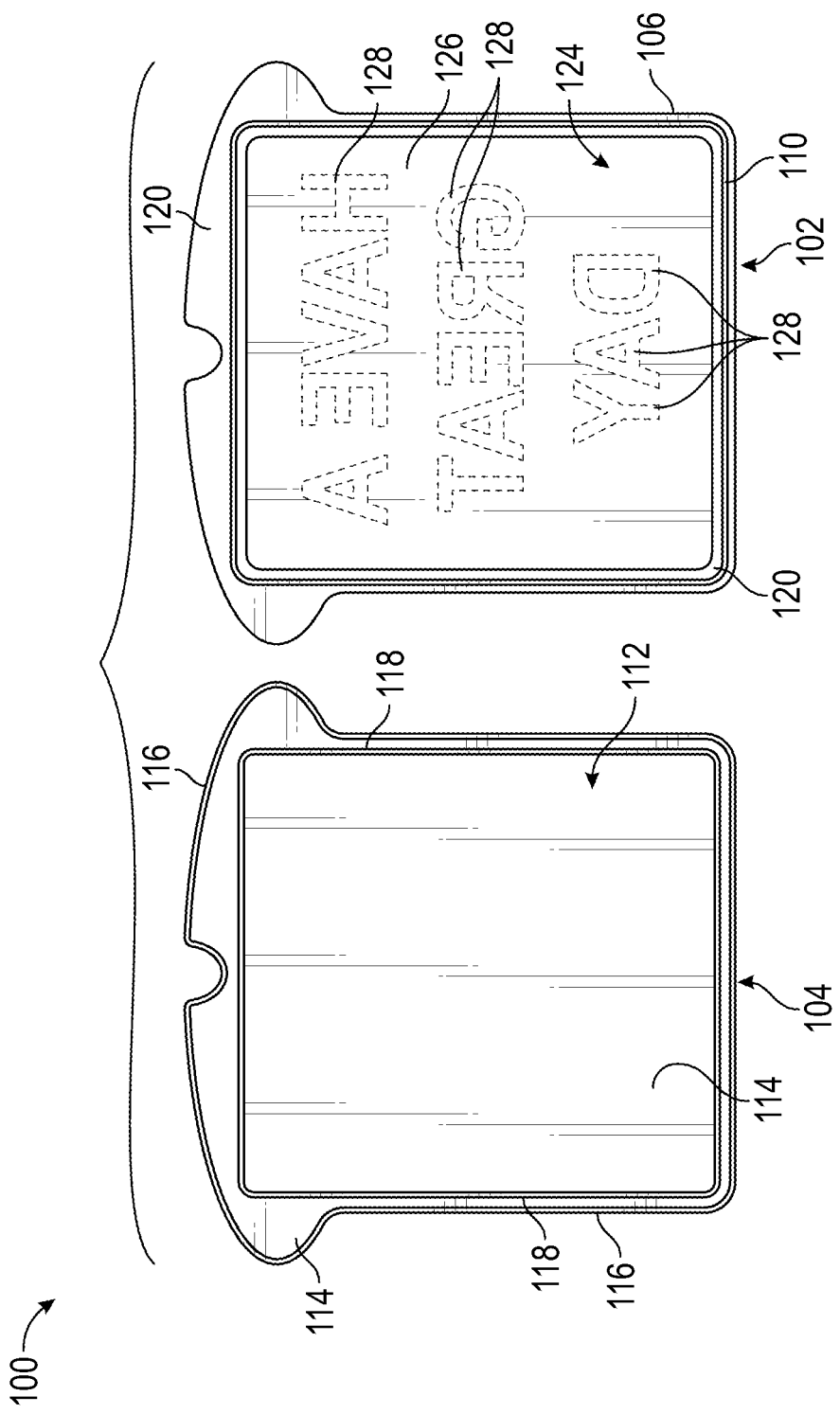
FIG. 2 illustrates a top view of the stamp system of FIG. 1 in an open configuration with the top portion of the stamp system positioned adjacent to the bottom portion of the stamp system.

Notably, the ridge 110 of the top portion 102 has a generally rectangular shape with curved corners, which in some implementations may be a generally square shape with curved corners (see FIG. 2). Notably, in some embodiments, the generally rectangular shape of the ridge 110 may be modified to be more rectangular (or other shaped) in order to more specifically match other types of edible food (e.g., a generally circular shaped ridge 110 for pancakes). As described above, the ridge 110 has dimensions that enable it to be received within the outer ridge 116 and around the inner ridge 118 of the bottom portion 104 of the stamp system 100. Thus, the ridge 110 of the top portion 102 may be seated, either snugly or loosely, within the gap between the inner ridge 118 and the outer ridge 116 of the bottom portion 104 of the stamp system 100.

FIG. 2 illustrates a top view of the stamp system 100 in an open configuration with the top portion 102 turned over and positioned adjacent to the bottom portion 104. As shown in FIG. 2, the stamp system 100 includes a removable lettering insert 124 that includes a stamp mounting plate 126 and a plurality of raised letters 128, which may comprise a rubber material, temporarily affixed to the mounting plate 126. The removable lettering insert 124 may include any raised design, including any combination of raised letters or other symbols, any artistic or ornamental shapes, or any other desired design, in place of the raised letters 128. The lettering insert 124 may be coupled to the lower surface 120 of the main body 106 of the top portion 102 (which is inverted in FIG. 2) by mechanical features, such as clips, that retain the lettering insert 124 on the lower surface 120. Alternatively, adhesives may be employed, or the mounting plate 126 and the main body 106 may be fabricated from materials that naturally adhere to one another. The stamp system 100 may include a plurality of different lettering inserts with various different designs, which may be interchanged with one another and interchangeably coupled to the lower surface 120 of the main body 106 of the top portion 102, as desired by a user.

Figure 3:
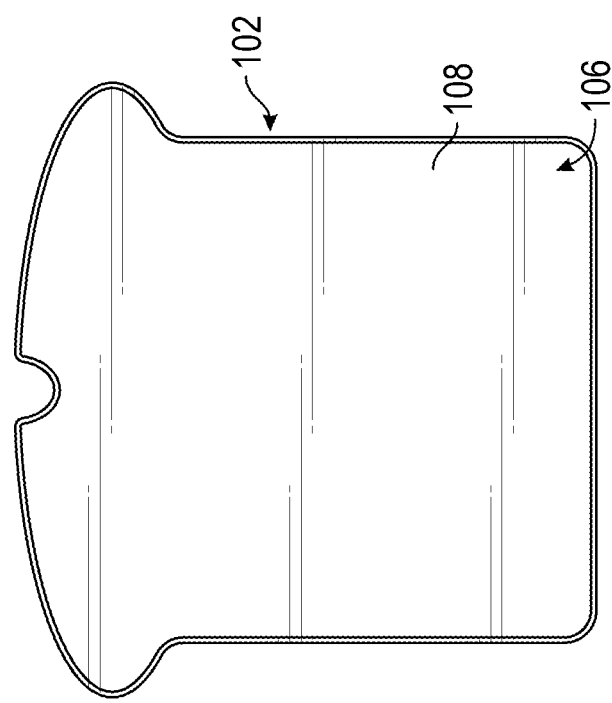
FIG. 3 is a top view of the stamp system of FIG. 1 in a closed configuration.
Figure 4:
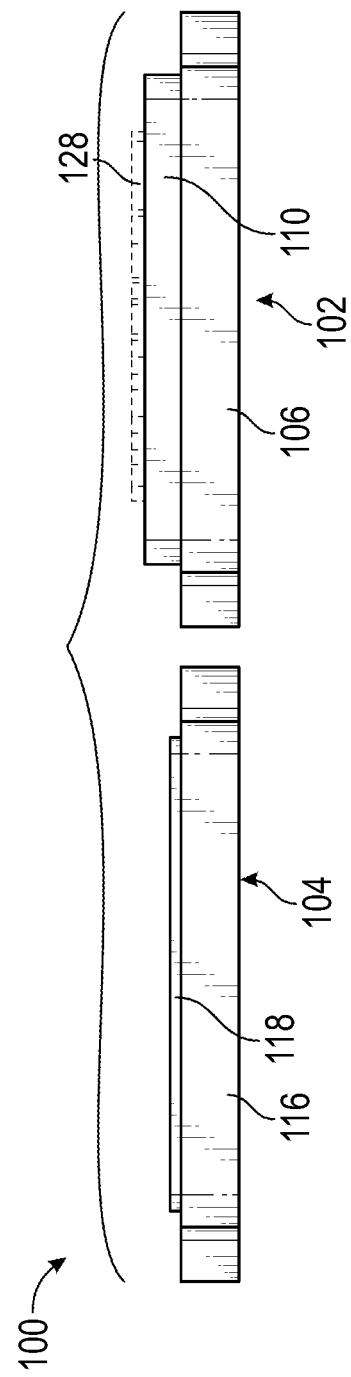
FIG. 4 is a front view of the stamp system of FIG. 1 in an open configuration with the top portion of the stamp system positioned adjacent to the bottom portion of the stamp system.

FIG. 3 illustrates a top view of the stamp system 100 in a closed configuration so that only the upper surface 108 of the main body 106 of the top portion 102 is visible. FIGS. 4, 5, and 6 illustrate front, rear, and left-side views, respectively, of the stamp system 100 with the top portion 102 separated from the bottom portion 104. FIGS. 4, 5, and 6 illustrate the inner ridge 118 of the bottom portion 104 extending away from the main body 112 of the bottom portion 104 further than the outer ridge 116. FIGS. 4, 5, and 6 also illustrate the raised letters 128 extending away from the main body 106 of the top portion 102 further than the ridge 110. The raised letters 128 may extend away from the main body 106 further than the ridge 110 by a distance that is greater than similar distances in standard stamps (such as by a factor of two) so that the raised letters 128 actually emboss a surface of an edible food (e.g., a sandwich) as well as to leave edible ink upon the surface of the edible food. FIG. 7 illustrates a bottom view of the stamp system 100 in a closed configuration so that only the lower surface 122 of the main body 112 of the bottom portion 104 is visible.

To use the stamp system 100, a user first selects the removable lettering insert 124 from a plurality of removable lettering inserts and temporarily fastens the lettering insert 124 to the lower surface 120 of the top portion 102. The user then positions edible ink (or an edible ink pad) within the inner ridge 118 of the bottom portion 104. In some embodiments, the ink is an edible ink, such as a standard food dye or mixture that contains a standard food dye. The user may then engage the top portion 102 with the bottom portion 104 so that the ridge 110 is seated between the inner ridge 118 and the outer ridge 116, and so that the raised letters 128 of the lettering insert 124 contact the edible ink (or the edible ink pad) so that the edible ink is picked up by the raised letters 128. The user may then remove the top portion 102 from the bottom portion 104 and impress the ink-covered bottom surfaces of the raised letters 128 into an edible piece of food, such as a slice of bread, a tortilla, or a pancake. The user may then remove the top portion 102 from the piece of food, leaving a physical impression in the shape of the raised letters 128 in the piece of food, and leaving the edible ink in the impression in the shape of the raised letters 128.

In some embodiments, the user may use stamp system 100 that includes multiple stamps to apply different colors of edible inks to the piece of food (and/or different embossing shapes to the piece of food) in a plurality of layers. For example, the user may use a first stamp of the stamp system 100 to apply a first edible ink of a first color in a first layer as described above. The user may then use a second stamp of the stamp system 100 to apply a second edible ink of a second color in a second layer over the first layer, in the manner described above. Notably, different embossing shapes to the piece of food in layers as well as the same time. In some embodiments, outer surfaces of the top and bottom portions 102 and 104 may be textured to resemble a slice of bread. Importantly, the stamp system 100 provides technological advantages over various other commercially-available stamp systems. For example, the stamp system 100 has no springs or other mechanisms that typically become stuck or jammed when used with edible items such as bread and edible inks.

The various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stamping system for stamping an edible item, comprising:
a top portion including a first main body having a first upper surface, a first lower surface, and a top ridge coupled to and extending perpendicularly downward from the first lower surface of the first main body of the top portion;
a plurality of interchangeable removable inserts, each of the removable inserts including a respective raised design that includes letters, symbols, or combinations thereof,
wherein the plurality of interchangeable removable inserts are attachable and removable from a portion of the first lower surface of the first main body of the top portion circumscribed by the top ridge;
a bottom portion including a second main body having a second upper surface, a second lower surface, a first bottom ridge coupled to and extending perpendicularly upward from the second upper surface of the second main body of the bottom portion, and a second bottom ridge coupled to and extending perpendicularly upward from the second upper surface of the second main body of the bottom portion outside of the first bottom ridge of the second main body of the bottom portion, and
an ink pad positioned within each of the first and second bottom ridges of the bottom portion, the ink pad configured to receive ink that is transferable to the plurality of interchangeable removable inserts when the top portion of the stamping system is placed onto the bottom portion of the stamping system;
wherein the plurality of interchangeable inserts are configurable to stamp the ink pad positioned within each of the first and second bottom ridges of the bottom portion, and then stamp a surface of the edible item.

2. The stamping system of claim 1, wherein an inner surface of the top ridge of the top portion engages with an outer surface of the first bottom ridge of the bottom portion when the top portion of the stamping system is placed onto the bottom portion of the stamping system.

3. The stamping system of claim 1, wherein the first bottom ridge of the bottom portion has a circular shape and the top ridge of the top portion has a corresponding circular shape.

4. The stamping system of claim 1, wherein the first bottom ridge of the bottom portion has a shape that is generally rectangular with curved corners and the top ridge of the top portion has a corresponding shape that is generally rectangular with curved corners.

5. The stamping system of claim 1, wherein one of the removable inserts is removably coupled to the first lower surface of the first main body of the top portion.

6. The stamping system of claim 5, wherein the one of the removable inserts is removably coupled to the first lower surface of the first main body of the top portion by a mechanical fastener.

7. The stamping system of claim 5, wherein the one of the removable inserts is removably coupled to the first lower surface of the first main body of the top portion by an adhesive.

8. The stamping system of claim 1, wherein the stamping system includes no springs.

9. A stamping system for stamping an edible item, comprising:
a top portion including a first main body having a first upper surface, a first lower surface, and a top ridge coupled to and extending perpendicularly downward from the first lower surface of the first main body of the top portion;

a plurality of interchangeable removable inserts, each of the removable inserts including a respective raised design that includes letters, symbols, or combinations thereof, wherein the plurality of interchangeable removable inserts are attachable and removable from a portion of the first lower surface of the first main body of the top portion circumscribed by the top ridge;

a bottom portion including a second main body having a second upper surface, a second lower surface, and an inner bottom ridge coupled to and extending perpendicularly upward from the second upper surface of the second main body of the bottom portion, the bottom portion further including an outer bottom ridge coupled to and extending perpendicularly upward from the second upper surface of the second main body of the bottom portion outside of the inner bottom ridge of the second main body of the bottom portion, and an ink pad positioned within the inner bottom ridge of the bottom portion, the ink pad configured to receive ink that is transferable to the plurality of interchangeable removable inserts when the top portion of the stamping system is placed onto the bottom portion of the stamping system;

wherein the plurality of interchangeable removable inserts are configurable to stamp the ink pad positioned within the inner bottom ridge of the bottom portion, and then stamp a surface of the edible item;

wherein the top ridge of the top portion is configured to be seated within a gap between the inner bottom ridge and the outer bottom ridge of the bottom portion, wherein the stamping system includes no springs.

10. The stamping system of claim 9, wherein the inner bottom ridge of the bottom portion includes a first section, a second section, a third section, and a fourth section, wherein the first section is parallel to the third section, and wherein the second section is parallel to the fourth section.

11. The stamping system of claim 10, wherein the top ridge of the top portion includes a first section, a second section, a third section, and a fourth section, wherein the first section is parallel to the third section, and wherein the second section is parallel to the fourth section.

12. The stamping system of claim 11, wherein the first section and the third section of the inner bottom ridge of the bottom portion are parallel to the first section and the third section of the top ridge of the top portion, and wherein the second section and the fourth section of the inner bottom ridge of the bottom portion are parallel to the second section and the fourth section of the top ridge of the top portion.

13. The stamping system of claim 9, wherein a gap between the inner bottom ridge and the outer bottom ridge of the bottom portion corresponds to a thickness of the top ridge of the top portion.

14. The stamping system of claim 13, wherein the top ridge of the top portion is configured to be seated snugly within the gap between the inner bottom ridge and the outer bottom ridge of the bottom portion.

* * * * *